United States Patent
Cox et al.

(10) Patent No.: US 6,563,808 B1
(45) Date of Patent: May 13, 2003

(54) APPARATUS FOR INCORPORATING MULTIPLE DATA RATES IN AN ORTHOGONAL DIRECT SEQUENCE CODE DIVISION MULTIPLE ACCESS (ODS-CDMA) COMMUNICATIONS SYSTEM

(75) Inventors: Timothy F. Cox, Palo Alto, CA (US); Francis D. Natali, Townsend, WA (US); John E. Ohlson, Mt. View, CA (US); Shilpa Talwar, Sunnyvale, CA (US)

(73) Assignee: Stanford Telecommunications, Inc., Sunnyvale, CA (US)

(*) Notice: Subject to any disclaimer, the term of this patent is extended or adjusted under 35 U.S.C. 154(b) by 0 days.

(21) Appl. No.: 09/250,845

(22) Filed: Feb. 17, 1999

Related U.S. Application Data

(60) Provisional application No. 60/076,756, filed on Mar. 4, 1998.

(51) Int. Cl.$^7$ ................................ H04B 7/216
(52) U.S. Cl. ................. 370/335; 370/342; 370/320; 455/500
(58) Field of Search ................. 370/335, 342, 370/320, 336, 465, 208, 209, 468, 479, 441; 455/500

(56) References Cited

U.S. PATENT DOCUMENTS

| | | | |
|---|---|---|---|
| 5,103,459 A | 4/1992 | Gilhousen et al. | 375/1 |
| 5,228,054 A | 7/1993 | Rueth et al. | 375/1 |
| 5,515,396 A | 5/1996 | Dalekotzin | 375/206 |
| 5,619,524 A | 4/1997 | Ling et al. | 375/200 |
| 5,668,795 A * | 9/1997 | Magill et al. | 370/209 |
| 5,903,555 A * | 5/1999 | Wildauer et al. | 370/342 |
| 6,317,412 B1 * | 11/2001 | Natali et al. | 370/208 |
| 6,396,826 B1 * | 5/2002 | Ohlson et al. | 370/320 |

FOREIGN PATENT DOCUMENTS

| | | | |
|---|---|---|---|
| EP | 0814581 | 12/1997 | |
| EP | 814581 A2 * | 12/1997 | H04B/1/69 |

OTHER PUBLICATIONS

Peter R. Pawlowski,, Performance of ODS_CDMA QPSK in a sot limiting AM/AM non linearity channel, Sep. 1998, pp 789–794,IEEE>.*

Peter R.Pawlowski, On the Deorthogonalization of ODS_CDMA 4_PSK in frequency NOnselective Shadowed Rician fading, 1995, pp 424–430. <IEEE>.*

* cited by examiner

*Primary Examiner*—Edward F. Urban
*Assistant Examiner*—Tilahun B Gesesse
(74) *Attorney, Agent, or Firm*—Jim Zegeer

(57) ABSTRACT

An ODS-CDMA communications system is disclosed with at least one hub station and a plurality of user terminals. Each user is assigned a code which is orthogonal to all of the other user codes. The orthogonal code period is chosen such that the code repeats an integer number of times in a data symbol time and the code is synchronized with the symbol transitions so that no data transitions occur within the code. Thus, the selection of an orthogonal code book which enables a high rate data to be spread using shorter code words, and conversely, low data rate to be spread using longer code words, all of which remain mutually orthogonal.

10 Claims, 2 Drawing Sheets

APPARATUS FOR INCORPORATING MULTIPLE DATA RATES IN AN ORTHOGONAL DIRECT SEQUENCE CODE DIVISION MULTIPLE ACCESS (ODS-CDMA) COMMUNICATIONS SYSTEM

REFERENCE TO RELATED APPLICATION

This application is the subject of provisional application Serial No. 60/076,756 filed Mar. 4, 1998 and entitled APPARATUS FOR INCORPORATING MULTIPLE DATA RATES IN AN ORTHOGONAL DIRECT SEQUENCE CODE DIVISION MULTIPLE ACCESS (ODS-CDMA) COMMUNICATIONS SYSTEM.

BACKGROUND AND BRIEF DESCRIPTION OF PRIOR ART

Spread spectrum communications is being used for a number of commercial applications and is proliferating at a rapid rate. Synchronous orthogonal direct sequence code division multiple access (ODS-CDMA) has been proposed (see U.S. Pat. No. 5,375,140, "Wireless Direct Sequence Spread Spectrum Digital Cellular Telephone System", incorporated herein by reference) as an effective technique for improving the capacity, i.e., bandwidth efficiency, of the more conventional quasi-orthogonal CDMA.

In conventional direct sequence (DS) spread spectrum CDMA systems, the individual users transmit on the same frequency using different pseudo-noise (PN) codes. The PN codes are quasi-orthogonal, i.e. they have relatively low but nonzero cross-correlation values with each other.

ODS-CDMA systems are designed such that all signals are received in time and frequency synchronism. Thus all users remain orthogonal to each other and, in an ideal world, any user can be recovered with no multiple access noise from other users. This is most practical in a star configured network where a multiplicity of users transmit to and receive from a single Hub Station. This configuration is used in cellular as well as satellite networks.

In an ODS-CDMA system, each user is assigned a code which is orthogonal to all of the other user codes (i.e. the orthogonal codes have a cross-correlation value of zero with each other). Further, the orthogonal code period is chosen such that the code repeats an integer number of times in a data symbol time (usually once, since this results in the maximum number of available orthogonal functions). The code epoch is synchronized with the symbol transitions so that no data transitions occur within the code. The number of users is limited by the number of orthogonal codes available, which is equal, at most, to the length of the code. Therefore, the chipping rate is equal to the maximum number of orthogonal users times the symbol rate.

Efficient use of the available bandwidth is accomplished by using bi-phase spreading and MPSK data modulation as taught in U.S. Pat. No. 5,687,166, "Modulation System for Spread Spectrum CDMA Communication," incorporated herein by reference.

It is often desirable to accommodate a mix of different rate users where the rates are related by $2^n$ where n is a positive integer. One code-efficient way to do this is to size the system for the lowest user rate and then demultiplex higher rate data onto multiple orthogonal codes, i.e. data of a user at 4 times the nominal rate would be demultiplexed and spread onto 4 codes which are then summed for transmission. This scheme, while efficient in the use of orthogonal codes, produces a signal with a wide dynamic range which is a disadvantage for the subscriber terminal power amplifier efficiency. It also requires multiple correlators and multiplexing to recover the original data stream. This technique is discussed by Ejzak, et al in "BALI: A Solution for High-Speed CDMA Data," in Bell Labs Technical Journal, vol. 2, no. 3, Summer 1997.

Another technique is disclosed in U.S. patent application Ser. No. 08/352,313, now U.S. Pat. No. 5,574,721, entitled "Orthogonal Code Division Multiple Access Communication System Having Multicarrier Modulation" incorporated herein by reference. In this disclosure, it is suggested that multiple ODS-CDMA signals be transmitted on orthogonally spaced carriers (i.e. spaced at the chipping rate) and the data from a single high rate user is demultiplexed onto the multiple carriers. Once again, this results in a signal with wide amplitude variation.

In U.S. Pat. No. 5,416,797 "System and Method for Generating Signal Waveforms in a CDMA Cellular Telephone System," incorporated herein by reference, lower data rates than the nominal are supported on the cell-to-mobile link (which is orthogonal), by repeating data symbols of a low rate user a number of times to obtain the nominal symbol rate. This sequence of symbols is then spread by an orthogonal code and transmitted at a lower power proportional to the lower rate. This technique has the disadvantage of not being orthogonal code space efficient, i.e. each low rate user uses the same amount of code space as a high rate user.

In "Design Study for a CDMA-Based Third Generation Mobile Radio System," IEEE Journal on Selected Areas in Communication, vol. 12, no. 4, May 1994, Baier, et al, propose to use variable length spreading codes to support variable data rates in a CDMA system. However, they propose to use PN codes that are not necessarily orthogonal.

OBJECTS OF THE INVENTION

An object of this invention is to provide a means by which an ODS-CDMA communications system can function efficiently with data rates that are not all equal. This non-homogeneity in data rates allows different users to communicate with different data bandwidths while the ODS-CDMA communications system signaling rate and orthogonal nature remain the same as in a homogeneous data rate system.

A further object of this invention is to provide an ODS-CDMA system which supports a mix of users, with data rates related by $2^n$, which makes efficient use of the available orthogonal code space, i.e. a user with symbol rate R/k uses 1/k of the code space of a user with symbol rate R.

It is a further object of this invention to ensure that users of all rates transmit a relatively constant amplitude signal. This is of particular importance to the subscriber terminal where high transmitter power efficiency (at or near saturation) is desirable due to the impact on cost and power consumption.

It is a further object of this invention to keep signal processing complexity to a minimum.

SUMMARY OF THE INVENTION

In an ODS-CDMA system, each user is assigned a code which is orthogonal to all of the other user codes (i.e. the orthogonal codes have a cross-correlation value of zero with each other). Further, the orthogonal code period is chosen such that the code repeats an integer number of times in a data symbol time (usually once, since this results in the maximum number of available orthogonal functions) and the code epoch is synchronized with the symbol transitions so that no data transitions occur within the code. Thus, in a perfectly synchronized system, the individual users can be demodulated with no interference from other users.

The number of users is limited by the number of orthogonal codes available, which is equal, at most, to the length of the code. Note that the chipping rate is equal to the maximum number of orthogonal users times the symbol rate. This implies that, for a fixed chipping rate, a system transmitting data at a rate of R/4 should be able to accommodate 4 times as many users as a system with rate R.

Efficient use of code space in a system with a mix of user rates ensures that a user with rate R/4 will only occupy 1/4 of the orthogonal function space of a user with rate R. The invention disclosed herein teaches an efficient way to construct such orthogonal codes by selection of an orthogonal codebook wherein subsequences of the codewords are also orthogonal. With such a codebook, short codes for high rate users are determined directly by the subsequences, and long codes for low rate users are determined by the Kronecker product of the subsequences with an orthogonal codeword allocated to these users. As a preferred embodiment, the Sylvester construction of a Hadamard matrix is used to generate the orthogonal codebook. Thus, this invention discloses how to efficiently support variable data rates in a synchronous ODS-CDMA communication system with constant chip rate.

The novelty of this invention lies in the selection of an orthogonal codebook which enables high rate data to be spread using shorter codewords, and conversely, low rate data to be spread using longer codewords, all of which remain mutually orthogonal.

Further, using this invention, each user transmits a single code that is constant in amplitude and requires no data multiplexing or demultiplexing. The disclosed technique results in low receiver and transmitter complexity since no additional code generators or correlators are required to accommodate rates that are higher or lower than the nominal data rate. Further, the constant amplitude nature of the signal allows efficient power amplification.

DETAILED DESCRIPTION OF THE INVENTION

Figure 1:
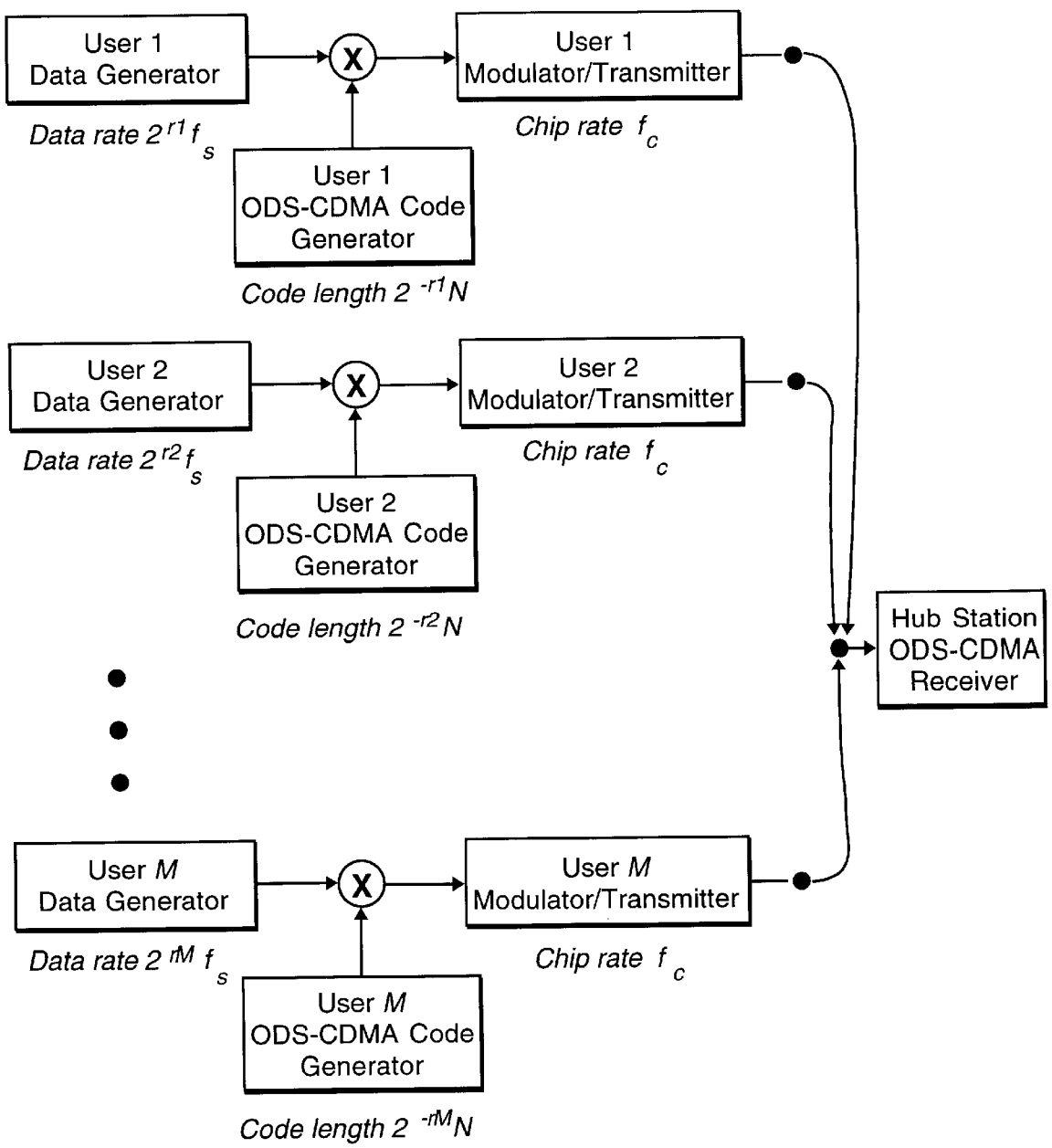
FIG. 1. Diagram of multi-rate ODS-CDMA Return Link Structure with M users

A generalized structure for an ODS-CDMA communications system is illustrated in FIG. 1. A Return Link structure is shown to facilitate the invention description, however, the concept can be applied to the Forward Link as well. In the Return Link structure, many users communicate with the Hub Station by means of a modulator and transmitter process that uses some medium for transmission. The most common medium for transmission is radio frequency electromagnetic radiation. In this example, all users in the Return Link transmit on the same carrier frequency using the same type of modulator. It is necessary that the users transmit at time instances such that all signals received at the Hub Station are time synchronous. The waveform transmitted by each user comprises of MPSK modulated data spread with an orthogonal ODS-CDMA code.

In order to accommodate multiple data rates while maintaining a constant chip rate for all users, the length of spreading code for each user is varied. An orthogonal codebook is constructed which enables high rate data to be spread using shorter codewords, and conversely, low rate data to be spread using longer codewords, all of which remain mutually orthogonal. In a preferred embodiment, the Sylvester construction of a Hadamard matrix is used to generate the codebook.

It is well known in the art that a Sylvester-Hadamard matrix of dimension N is defined recursively as $$H(N) = \begin{bmatrix} H(N/2) & H(N/2) \\ H(N/2) & -H(N/2) \end{bmatrix}$$

where $H(1)=[1]$ and $N=2^n$, where n is a positive integer. The N rows of the Hadamard matrix $H(N)$ define an orthogonal codebook. For convenience, the rows are indexed from 0 to N−1, starting from the top row. It can be seen from the recursive construction of $H(N)$ that it is composed of Sylvester-Hadamard submatrices of the form $\pm H(N/2^k)$, where k is a positive integer ranging from 1 to n−1. Since the rows of $H(N/2^k)$ are orthogonal, it follows that the codewords of $H(N)$ consist of subsequences of length $N/2^k$ that are orthogonal as well.

Consider a multi-rate ODS-CDMA communications system with fixed chip rate $f_c$, some fundamental data symbol rate $f_s$, and a codebook of N orthogonal sequences such that $f_c=Nf_s$. If there exist M Return Link users with data streams at the fundamental symbol rate, each user may be assigned one of the N orthogonal codewords as long as $M \geq N$. However, if there exist users that request higher or lower data rates compared to the fundamental rate, they may be assigned shorter or longer codewords, respectively. These shorter (longer) codes are constructed from the codeword in a fashion such that the orthogonal nature of the ODS-CDMA system is maintained and the code space is used efficiently. An illustrative example is considered first to motivate the general approach for constructing these variable length codewords.

Suppose one of the users request a higher symbol rate, say at twice the fundamental rate $2f_s$. Since the chip rate, which is the product of the spreading sequence length and the symbol rate, is fixed, it follows from $f_c=(N/2)(2f_s)$, that the spreading sequence length per symbol must be reduced to N/2. This can be implemented by spreading alternate symbols of the high rate user by the first N/2 chips of a codeword and the last N/2 chips of the same codeword. Since this codeword is sub-divided into two N/2 subsequences, the remaining codewords must be orthogonal over each of these two subsequences such that the users at fundamental rate $f_s$ and the high rate user at $2f_s$ do not mutually interfere, thereby maintaining orthogonality in the ODS-CDMA system. Consider allocating the $k^{th}$ codeword to this user (k=0, 1, ..., N−1). If a Sylvester-Hadamard matrix is used as the orthogonal codebook, the $(k+(N/2))_{mod(N)}$ codeword does not possess the required N/2 subsequence orthogonality since it contains the same two subsequences (up to a ± sign) and therefore cannot be allocated to other users. For example, if the high rate user is assigned the $k^{th}$ code word $c_k=[S_{N/2} \; S_{N/2}]$, the codeword $c_j=[S_{N/2}-S_{N/2}]$ for $j=(k+(N/2))_{mod(N)}$ cannot be assigned to another user, and vice versa. Note that if a user at rate $2f_s$ is assigned a single short subsequence in N/2 space (say subsequence $S_{N/2}$), this is equivalent to using two codewords in the N space codebook. Hence, in an alternative implementation, a rate $2f_s$ user may be supported by assigning the user a shorter subsequence of length N/2, and removing the codewords which contain this subsequence from the list of allocable codewords.

In general, a multi-rate ODS-CDMA system with a codebook of N Sylvester-Hadamard sequences (N=$2^p$ for some integer p), fundamental data symbol rate $f_s$, and a fixed chip rate $f_c=Nf_s$, can support users with higher data rates than the fundamental rate. The users may request to transmit data at rates $2^r f_s$, where r ranges from 0 to p. This is achieved by reducing the length of the spreading code to $N/2^r$ such that the chipping rate, $f_c=(N/2^r)(2^r f_s)$, remains constant. Subsequences of length $N/2^r$ can be generated by sub-dividing an allocated codeword of length N into $2^r$ sub-codes. These sub-codes are used to spread $2^r$ consecutive symbols of a data stream at rate $2^r f_s$. Note that in the case of the Sylvester-Hadamard sequences, any codeword of length N is a repeated subsequence of length $N/2^r$ (up to a ± sign), which is orthogonal to the other non-identical subsequences of the same length.

Further, if the $k^{th}$ codeword is composed of a repeated subsequence of length $N/2^r$ (up to a ± sign), then the codewords $(k+i(N/2^r))_{mod(N)}$, for all i=1,2, . . . , $2^r-1$ and r>0, are also composed of the same subsequence (up to a ± sign), and are no longer available for allocation, if system orthogonality is to be preserved. Indeed, supporting 1 user at data rate $2^r f_s$ is effectively equivalent to supporting $2^r$ users at rate $f_s$ since $2^r-1$ codes are rendered unusable.

In a network setting where multiple users are transmitting at different data rates, appropriate provisions must be made for accommodating the data rate request of a new user in terms of checking for allocable subsequences. In fact, the network controller must, before assigning a subsequence, make certain that it is not contained in the longer subsequence of a lower rate user (since the lower rate user would not be orthogonal over the subsequence length). Further, it must not contain a subsequence of shorter length that is already in use.

It is advantageous for the network controller to have the capability to change orthogonal sequence assignments periodically in order to most efficiently use the code space as the mix of user rates changes. In addition, since the symbol interval of data at rate $2^r f_s$ is reduced to $1/2^r$ times the symbol interval of data at rate $f_s$, it may be desired, depending on the application, to increase the transmit power by $2^r$ to maintain the same level of performance.

Conversely, a multi-rate ODS-CDMA communication system with a codebook of N orthogonal sequences, fundamental data rate $f_s$, and a fixed chip rate $f_c=Nf_s$, can support users with lower data rates than the fundamental rate. The users may request to transmit data at rates $f_s/2^r$, where r is a positive integer ranging from 0 to q. A lower rate user, at rate $f_s/2^r$, is assigned a longer spreading code of length $2^r N$ such that the chipping rate, $f_c=(2^r N)(f_s/2^r)$, remains constant. The long code is constructed from the codeword allocated to this user, $c_k$, k=0, . . . , N-1, as follows.

First, an orthogonal function set $G(2^r)$ of size $2^r$ is constructed. This could be, but is not necessarily, a Sylvester-Hadamard matrix. The Kronecker product of the $j^{th}$ row of $G(2^r)$ with the codeword $c_k$ produces a member $L_{jk}$, j=0, . . . , $2^r-1$ of a set of $2^r$ mutually orthogonal codes of length $2^r N$. Each of these long sequences is orthogonal to codewords $c_i$, where i≠k, as well as longer code words $L_{ji}$ formed by the Kronecker product of each row of $G(2^r)$ with the codewords $c_i$. Thus, up to $2^r$ users of rate $f_s/2^r$ can be assigned to a single code word $c_k$ by assigning each user a different row of $G(2^r)$. This code construction technique can be generalized to accommodate a mix of users with different rates of the form $f_s/2^r$, with the maximum aggregate symbol rate bounded by $f_s$.

The proposed scheme suggests that the symbol interval of data at rate $f_s/2^r$ is increased to $2^r$ times the symbol interval of data at rate $f_s$. It may be desired that a user at the lower data rate reduce transmit power by $2^r$ in order to maintain the same symbol-to-noise-energy ratio (Es/No).

The Hub Station receives a superposition of signal waveforms transmitted by the Return Link users. The received signal is demodulated and despread by the multi-rate ODS-CDMA receiver. The despreading operation involves correlating the received waveform with the spreading sequence of the desired user over a symbol interval. Hence, in a multi-rate system that supports users at higher data rates than $f_s$, the waveform of a user at rate $2^r f_s$ is despread by correlating it against the user's allocated $N/2^r$ chip subsequence. Conversely, in a multi-rate system that supports users at lower data rates than $f_s$, the waveform of a user at rate $f_s/2^r$ is despread by correlating it with the user's allocated $2^r N$ chip Kronecker-product code. In both cases, the despreading operation requires that the codewords of all users be time aligned at the code boundaries in order to preserve orthogonality, and that the data symbol rates of all users be known at the receiver. Furthermore, in a system supporting lower rates, the row index of $G(2^r)$, used in forming the Kronecker-product code, must be known at the receiver. Appropriate provisions are to be made in a multi-rate ODS-CDMA system to satisfy these requirements.

A functional block diagram of the Return Link structure in the proposed multi-rate ODS-CDMA system is shown in FIG. 1. In this figure, M users transmit data to the Hub Station at data symbol rates $2^{r_1}f_s, 2^{r_2}f_s, \ldots, 2^{r_M}f_s$, where rj, j=1, . . . , M, ranges from 0 to p for a system supporting higher rates than $f_s$, from -q to 0 for a system supporting lower rates than $f_s$, and -q to p for a system supporting both high rate and low rates. If the jth user requests a higher rate (rj≧0), the user's code generator generates a codeword of length N at rate $f_s$, which is equivalent to generating $2^{rj}$ sub-codes of length $2^{-rj}N$ in time-division multiplex at rate $2^{rj}f_s$. On the other hand, if the jth user requests a lower rate (rj≦0), the user's code generator generates a Kronecker-product code of length $2^{-rj}N$ at rate $2^{rj}f_s$. Hence, at each symbol interval, $T_j=1/(2^{rj}f_s)$, the data symbol of the jth user is multiplied by the codeword from the code generator, and the resulting chip sequence is modulated and transmitted to the Hub station.

Figure 2:
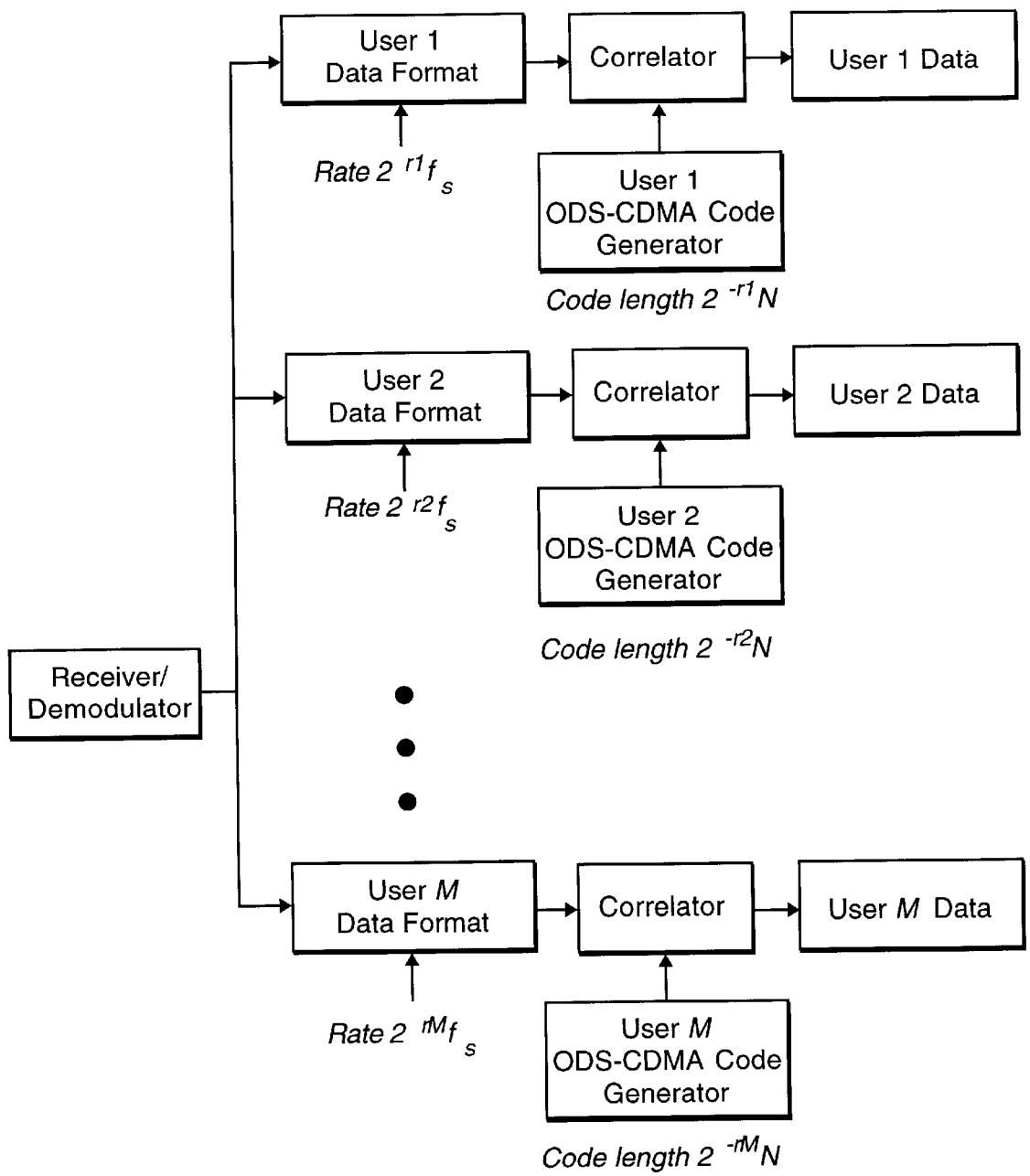
FIG. 2. Diagram of an Exemplary ODS-CDMA Receiver at the Hub Station

The Hub Station receives the composite signal waveform of the M Return Link users. The functional block diagram of an exemplary multi-rate ODS-CDMA receiver at the Hub Station is shown in FIG. 2. The receiver demodulates the received waveform and despreads it. For the jth user with rj≧0, despreading involves formatting each block of N chips of demodulated data into subsequences of length $2^{-rj}N$, and correlating each of these subsequences with the sub-code from the code generator. If rj≦0, each block of $2^{-rj}N$ chips is correlated with the long code from the code generator. In the absence of channel distortions, the correlator output yields the user data.

A simple illustrative example which embodies the present invention is as follows.

Consider a multi-rate ODS-CDMA system with a codebook derived from Sylvester-Hadamard matrix of dimension N=4, $$H(4) = \begin{bmatrix} +1 & +1 & +1 & +1 \\ +1 & -1 & +1 & -1 \\ +1 & +1 & -1 & -1 \\ +1 & -1 & -1 & +1 \end{bmatrix} = \begin{bmatrix} c_0 \\ c_1 \\ c_2 \\ c_3 \end{bmatrix}$$

fundamental data symbol rate $f_s$, and fixed chip rate $f_c=4f_s$.

Suppose User 1 is assigned codeword 0, $c_0=[+1+1+1+1]$, and is transmitting at rate $f_s$. Now, a new user, User 2, requests to transmit at rate $2f_s$. From the codes available for allocation, $c_1$, $c_2$ and $c_3$, only $c_1$ or $c_3$ may be allocated to User 2 since the length 2 subsequences of $c_2$, namely $[+1+1]$ and $[-1-1]$, are not orthogonal to the corresponding subsequences of $c_0$. Let code $c_1$ be assigned to User 2. The chip sequence transmitted by User 1 within the time interval $T_s=1/f_s$ is $x^{(1)}=s^{(1)}[+1+1+1+1]$, where $s^{(1)}$ is the current data symbol. Similarly, the chip sequence transmitted by User 2 within the same time interval is $x^{(2)}=[s_a^{(2)}[+1-1]\ s_b^{(2)}[+1-1]]$, where $s_a^{(2)}$ and $s_b^{(2)}$ are the current data symbols. Note that with the current allocation scenario, only code $c_3$ is available for allocation to a new user with symbol rate $f_s$ or lower. A user that requests a higher symbol rate cannot be supported unless the codes are reassigned.

The signal received at the Hub Station (after demodulation) is of the form $$r = x^{(1)} + x^{(2)}$$
$$= s^{(1)}[+1\ +1\ +1\ +1] + [s_a^{(2)}[+1\ -1]\ s_b^{(2)}[+1\ -1]].$$

The signal is despread by correlating it with the appropriate spreading code. For User 1, this is achieved by computing the following inner product $$\hat{s}^{(1)} = \frac{1}{4} r \cdot \begin{bmatrix} +1 \\ +1 \\ +1 \\ +1 \end{bmatrix},$$

which yields the transmitted data symbol. The data symbols of User 2 are retrieved by first partitioning the received chip sequence into 2 subsequences, $r=[r_a\ r_b]$, where $r_a=s^{(1)}[+1+1]+s_a^{(2)}[+1-1]$ and $r_b=s^{(1)}[+1+1]+s_b^{(2)}[+1-1]$ and then computing the following inner products $$\hat{s}_a^{(2)} = \frac{1}{2} r_a \cdot \begin{bmatrix} +1 \\ -1 \end{bmatrix}, \text{ and } \hat{s}_b^{(2)} = \frac{1}{2} r_b \cdot \begin{bmatrix} +1 \\ -1 \end{bmatrix}.$$

Now, suppose a third user, User 3, requests to transmit at rate $f_s/2$. Let this user be assigned codeword $c_3$ and row 0 of G(2), the Sylvester-Hadamard of order 2. The long spreading code for User 3 is given by the Kronecker product of row 0 of G(2) with the codeword $c_3$:

$$L_{03} = [+1\ +1] \otimes c_3$$
$$= [c_3\ c_3],$$

which is 8 chips long.

An additional user at rate $f_s/2$ may be accomodated with the orthogonal code constructed by taking the Kronecker product of row 1 of G(2) with $c_3$ to give $L_{13}=[+1-1]\otimes c_3=[c_3 -c_3]$, or 2 additional users can be supported at the rate $f_s/4$ by taking the Kronecker product of the rows of G(2) with $L_{13}$ to construct $L'_{03}=[+1+1]\otimes L_{13}=[c_3 -c_3\ c_3 -c_3]$ and $L'_{13}=[+1-1]\otimes L_{13}=[c_3 -c_3 -c_3\ c_3]$. Note that the codes $L'_{03}$ and $L'_{13}$ are 16 chips long.

At the Hub Station, the data symbols of User 3 are retrieved by correlating the signal received over time period $T_s=2/f_s$ with the long code $L_{03}$. It follows from the construction of the codes that the interference from Users 1 and 2 is zero at the correlator output.

In summary, the example system described above can support higher rates than $f_s$ of $2f_s$, $4f_s$, and lower symbol rates of $f_s/2$, $f_s/4$, ... $f_s/2^q$.

If the multi-rate system allows high rates only, at full capacity with total system throughput $4f_s$, the following allocation scenarios can be supported:

a) 4 users transmit at $f_s$ b) 2 users transmit at $f_s$, and 1 user transmits at $2f_s$ c) 2 users transmit at $2f_s$ d) 1 user transmits at $4f_s$ Conversely, if the multi-rate system allows low rates only, for each codeword $c_k$, k=0,1,2,3, some of the scenarios that can be supported are:

a) 1 user transmits at $f_s$ b) 2 users transmit at $f_s/2$ c) 2 users transmit at $f_s/4$, and 1 user transmits at $f_s/2$ d) 4 users transmit at $f_s/4$ e) $2^q$ users transmit at $f_s/2^q$ Note that a maximum data rate of $f_s$ can be supported per codeword, yielding, as before, a total system throughput of $4f_s$. Finally, if the multi-rate system allows both high and low data rates, a variety of allocation scenarios are possible, and again the total system throughput is bounded by $4f_s$.

What is claimed is:

1. In an ODS-CDMA communications system with at least one Hub Station and a plurality of user terminals, a means for generating a codebook of N orthogonal sequences where $N=2^p$ for some integer p, a fundamental data symbol rate $f_s$, and a fixed chip rate $f_c$ where $f_c=Nf_s$, the improvement comprising:

means for supporting users with multiple data rates by assigning them mutually orthogonal codes of different lengths, while maintaining, the same chip rate, and the same peak-to-average ratio at the transmitter as in a homogeneous data rate system.

2. In the system of claim 1, where users desiring to transmit data at a rate of $2^r f_s$, where r ranges from 0 to p, are assigned orthogonal subsequences of length $N/2^r$ generated by sub-dividing the allocated codeword of length N, from the codebook of N orthogonal sequences, into $2^r$ subsequences.

3. In the system of claim 1, the Sylvester construction of a Hadamard matrix is used to generate the orthogonal codebook such that select subsequences of the codewords in the codebook are also orthogonal.

4. The system of claim 1, wherein users may request lower rates than the fundamental data symbol rate $f_s$. The data symbols of a low rate user at rate $f_s/2^r$, where r may range from 0 to q, are spread using a longer code of length $2^r N$, which is constructed by the Kronecker product of a length $2^r$ orthogonal code and the N chip codeword allocated to this user.

5. The system of claim 1, wherein users may request lower rates than the fundamental data symbol rate $f_s$. The data symbols of a low rate user at rate $f_s/2^r$, where r may range from 0 to q, are spread using a longer code of length $2^rN$, which is constructed by the Kronecker product of a row of the Sylvester-Hadamard matrix $H(2^r)$ and the N chip codeword allocated to this user.

6. In an ODS-CDMA communications system with at least one Hub station and a plurality of user terminals, one or more satellites or other means for relaying the signals to and from the Hub Station, a means for generating a codebook of N orthogonal sequences where $N=2^p$ for some integer p, a fundamental data symbol rate $f_s$, and a fixed chip rate $f_c$ where $f=Nf_s$, the improvement comprising:

means for supporting users with multiple data rates by assigning them mutually orthogonal codes of different lengths, while maintaining, the same chip rate, and the same peak-to-average ratio at the transmitter as in a homogeneous data rate system.

7. In the system of claim 6, where users desiring to transmit data at a rate of $2^rf_s$, where r ranges from 0 to p, are assigned orthogonal subsequences of length $N/2^r$ generated by sub-dividing the allocated codeword of length N, from the codebook of N orthogonal sequences, into $2^r$ subsequences.

8. In the system of claim 6, the Sylvester construction of a Hadamard matrix is used to generate the orthogonal codebook such that select subsequences of the codewords in the codebook are also orthogonal.

9. The system of claim 6, wherein users may request lower rates than the fundamental data symbol rate $f_s$. The data symbols of a low rate user at rate $f_s/2^r$, where r may range from 0 to q, are spread using a longer code of length $2^2N$, which is constructed by the Kronecker product of a length $2^r$ orthogonal code and the N chip codeword allocated to this user.

10. The system of claim 6, wherein users may request lower rates than the fundamental data symbol rate $f_s$. The data symbols of a low rate user at rate $f_s2$, where r may range from 0 to q, are spread using a longer code of length $2^rN$, which is constructed by the Kronecker product of a row of the Sylvester-Hadamard matrix $H(2^r)$ and the N chip codeword allocated to this user.

* * * * *